US012241623B1

(12) United States Patent
Wu

(10) Patent No.: US 12,241,623 B1
(45) Date of Patent: Mar. 4, 2025

(54) SITUATIONAL AIR BUBBLE SPA MACHINE

(71) Applicant: Tsai-Ying Wu, New Taipei (TW)

(72) Inventor: Tsai-Ying Wu, New Taipei (TW)

( * ) Notice: Subject to any disclaimer, the term of this patent is extended or adjusted under 35 U.S.C. 154(b) by 0 days.

(21) Appl. No.: 18/586,904

(22) Filed: Feb. 26, 2024

(30) Foreign Application Priority Data

Jan. 19, 2024 (TW) ................................ 113200673

(51) Int. Cl.
*F21V 33/00* (2006.01)
*A61H 33/00* (2006.01)
*A61H 33/02* (2006.01)
*F21V 23/00* (2015.01)
*F21Y 113/00* (2016.01)

(52) U.S. Cl.
CPC ......... *F21V 33/004* (2013.01); *A61H 33/025* (2013.01); *F21V 23/003* (2013.01); *A61H 2033/0058* (2013.01); *A61H 2033/0083* (2013.01); *A61H 2201/0107* (2013.01); *A61H 2201/5025* (2013.01); *F21Y 2113/30* (2023.05)

(58) Field of Classification Search
CPC ................ F21V 33/004; F21V 23/003; A61H 2033/0058; A61H 2033/0083; A61H 2201/0107; A61H 2201/5025
See application file for complete search history.

(56) References Cited

U.S. PATENT DOCUMENTS 4,535,489 A * 8/1985 Elkins ................... F21V 33/004 4/584
5,604,940 A * 2/1997 Shimizu ................... A47K 3/10 4/541.1
6,877,171 B2 * 4/2005 Shimizu ............... G02B 6/0006 4/541.1
8,550,643 B2 * 10/2013 Kownacki ............. F21V 33/004 362/85
9,883,776 B2 * 2/2018 Jechart ................. G08B 21/084
10,681,793 B1 * 6/2020 Sanson ................... F21V 31/00
11,608,977 B1 * 3/2023 Cascia .................. F21V 31/005
11,622,436 B2 * 4/2023 Sanson .................. H05B 45/10 315/291
11,865,064 B2 * 1/2024 Ovalle ............... A61H 33/0095

* cited by examiner

*Primary Examiner* — Arman B Fallahkhair
(74) *Attorney, Agent, or Firm* — Muncy, Geissler, Olds & Lowe, P.C.

(57) ABSTRACT

A situational air bubble spa machine is provided, which includes a control host, an air provider, pipe fittings, and a bubble bathmat. The control host is communicated to the air provider. The air provider and the bubble bathmat are connected through the pipe fittings. The control host includes a main body, a light emitting element arranged inside the main body, a control button set arranged on the top surface of the main body. The control button set includes a startup/shutdown button which is used to regulate the startup/shutdown of the control host, an intensity button is used to regulate the air flow provided by the air provider to the bubble bathmat, thereby regulating the bubble density, and a lighting button is used to control the startup, shutdown, and lighting mode of the light emitting elements, and a fixing bracket is arranged on the bottom surface of the main body.

14 Claims, 4 Drawing Sheets

SITUATIONAL AIR BUBBLE SPA MACHINE

CROSS-REFERENCE TO RELATED APPLICATIONS

This application claims the benefit of TW113200673, filed Jan. 19, 2024, which is incorporated in its entirety by reference herein.

FIELD OF THE INVENTION

The present invention relates to a spa machine, particularly relates to a situational air bubble spa machine that can generate situational light and place on the water surface, in the water, under the water surface or in a home environment.

BACKGROUND OF THE INVENTION

The bathing device is a common massage equipment that can output air bubbles in the water, allowing to massage the user's body through the continuous output of bubbles while taking a bath. However, due to the high cost of building a bathing device and need to renovate the bathroom at home, the cost is not affordable for ordinary people. For the safety of daily life in the bathroom, the lights in the bathroom are relatively bright, but the bright light shine on the entire bathroom, although people are enjoying a massage bath, but people cannot fully relax because the lights are too light.

Although there is a bathing device with its own lights disclosed in the prior art, but the cost of the bathing device with its own lights is even higher than the aforementioned bathing device. It is no longer affordable for ordinary office workers, and this kind of bathing device with its own lights requires more light groups that allows light to spread throughout the entire bathing device, so that the maintenance is difficult. In addition, the light installed on the upper side of this kind of the bathing device may shine directly into the user's eye to cause the uncomfortable to the user when the water height is insufficient.

In order to solve the problem of the high price of the bathing device and inability to move at will, another technology discloses a bubble bathmat that can be placed in the bathing device. The bubble bathmat generates air bubble through a connected pump, and the bubble bathmat provides bubbles for massage without replacing the bathing device. In another prior art, in order to achieve the effect of situational lighting, a light emitting diodes is used a situational light and are provided on the pipe fittings of the bubble bathmat, however, the bubble bathmat with the situational light usually placed at the user's feet. When the user uses the bubble bathmat with situational light in the bathing device, the light source of the situational light will shine directly into the user's eyes to cause uncomfortable to user.

SUMMARY OF THE INVENTION

According to above drawbacks of the prior art, the present invention provides a situational air bubble spa machine, the main object of the situational air bubble spa machine can be placed floating on the water, fixed under the water, or anywhere in the situational air bubble spa machine according to the use's preference.

It is another object of the present invention is that the situational light of the situational air bubble spa machine can be rendered in the entire bathing environment through the refraction of the water, and the situational light source will not directly shine into the user's eyes, so that the user can not only enjoy the massage and the bath comfortably, but also enjoy the visual light.

It is yet object of the present invention is that when the user is massaging and taking a bath, the user can directly the control the air flow output by the air provider to regulate the bubble density generated by the bubble bathmat by using the situational air bubble spa machine, and the situational air bubble spa machine is used to control the color and brightness changes of the light emitting element used as situational light.

It is still an object of the present invention is that the situational air bubble spa machine can be easily carried and stored, and user can also enjoy situational bubble massage when they are on a business trip or going abroad and staying in a hotel.

According to above objects, the present invention provides a situational air bubble spa machine, which is composed of a control host, an air provider, and a bubble bathmat. The control host is communicated with the air provider, the air provider is connected with the bubble bathmat by pipe fittings. The control host includes a main body, a light emitting element disposed in the main body, control button set arranged on a top surface of the main body, in which the control button set at least includes a startup/shutdown button, an intensity button and a lighting button. The startup/shutdown button is used to control the startup/shutdown of the control host, the intensity button is used to regulate the air flow provided by the air provider to the bubble bathmat, thereby the bubble density generated by the bubble bathmat. The lighting button is used to regulate the startup, shutdown, and lighting mode of the light emitting element. The fixing bracket is provided on the bottom surface of the main body.

DETAILED DESCRIPTION OF THE PREFERRED EMBODIMENT

Figure 1:
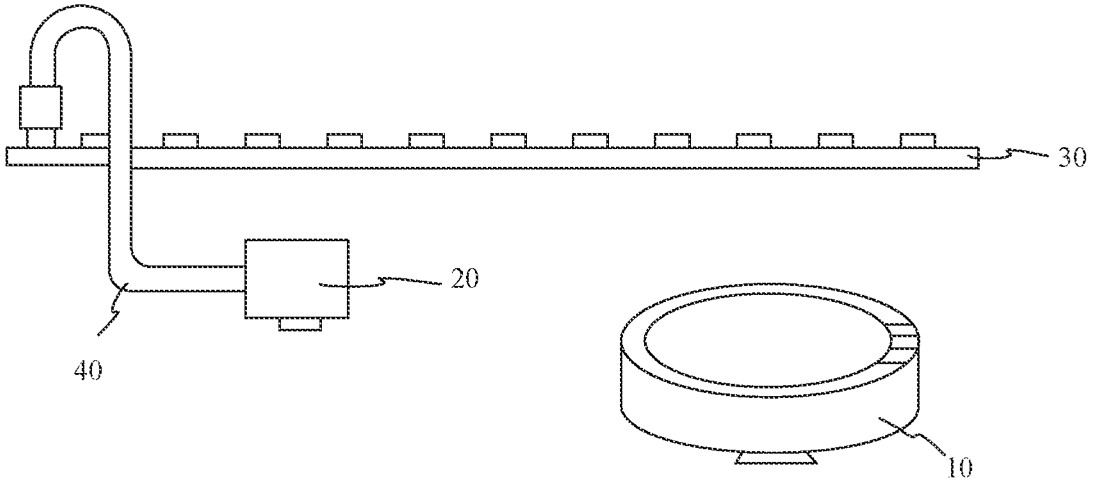
FIG. 1 is a schematic diagram showing a situational air bubble spa machine in accordance with the present invention disclosed herein.

Please refer to FIG. 1. FIG. 1 is a schematic diagram showing a situational air bubble spa machine in accordance with the present invention disclosed herein. In FIG. 1, a situational air bubble spa machine 1 is composed of a control host 10, an air provider 20, a bubble bathmat 30 and a pipe fittings 40, in which the control 10 is communicated with the air provider 20, the air provider 20 is connected to the bubble bathmat 30 through the pipe fittings 40. When the bubble bathmat 30 is placed in a bathing device (not shown) filled with water, the control host 10 is used to execute the startup/shutdown of the air provider 20 and regulate the air flow output by the air provider 20. The air passes through the pipe fittings 40 into the bubble bathmat 30 and is ejected from the air hole of the bubble bathmat 30 to generate bubbles in the water, thereby producing the massage effect on the user. The air provider 20, the bubble bathmat 30 and the pipe fittings 40 are currently existing technologies and will not be described herein.

Figure 2:
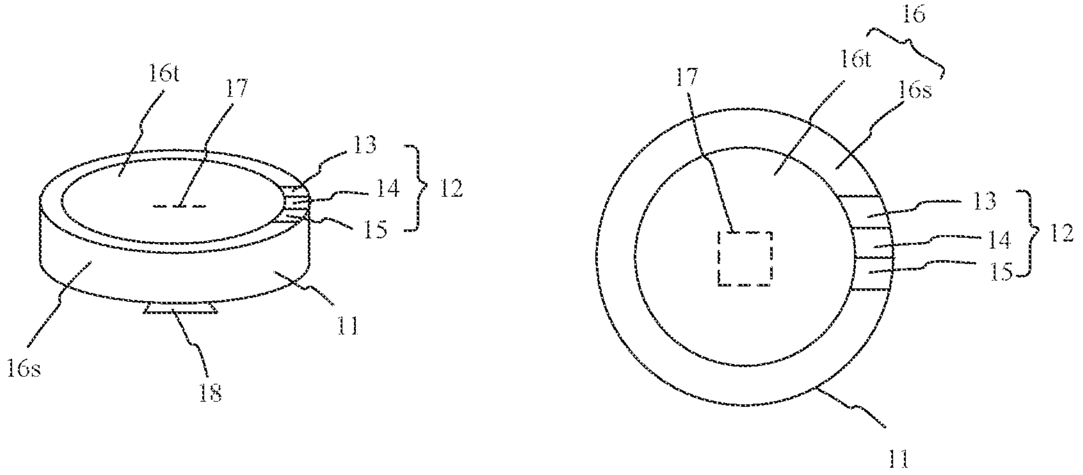
FIG. 2 is a side view and a top view of the control host of the situational air bubble spa machine in accordance with the present invention disclosed herein.

Next, please refer to FIG. 2. FIG. 2 is a side view and a top view of the control host of the situational air bubble spa machine in accordance with the present invention disclosed herein. In FIG. 2, the control host 10 includes a main body 11, a control button set 12, a light emitting element 17 and a fixing bracket 18. The control button set 12 is arranged on the top surface 16*t* of the main body 11, in which the control button set 12 includes a startup/shutdown button 13, an intensity button 14 and a lighting button 15. the startup/shutdown button 13 is used to control the startup/shutdown of the control host 10. Thus, the user can remotely startup/shutdown the air provider 20 directly through the control host 10 (as shown in FIG. 1). The user does not need to leave the bathing device (not shown) to startup/shutdown the air provider 20 manually, thereby the risk of electric shock or leakage of electrical equipment caused by the user contacting electrical equipment in a humid state can be reduced. The light emitting element 17 is arranged in the main body 11, the light emitting direction of the light emitting element 17 faces the light-emitting surface 16 of the control host 10, so that the entire control host 10 is like a lamp, which can be used as temporary lighting, so that the user does not need to worry about the risk of slipping due to the insufficient lighting in a bathing environment such as bathrooms. In addition, the control host 10 can also be used as an independent situational lighting, the situational light generated by the control host 10 is refracted and reflected by the environment, allowing the user to relax in the environment. It should be noted that the light emitting surface 16 is the top surface 16*t* and the side surface 16*s* of the main body 11, and the top surface 16*t* and the side surface 16*s* is a diffusion plate or further include a diffusion plate (not shown), thereby the light emitted by the light emitting element 17 can be diffused outward from the top surface 16*t* and the side surface 16*s* to increase the irradiation range of the light emitting element 17, which also solve the problem in the prior art that the situational lights on the pipe fittings of the bubble bathmat without diffusion plate so as to diffuse the light to cause the uncomfortable when the user look the light emitted by the light emitting element 17 directly.

The fixing bracket 18 is arranged the bottom surface of the main body 11 of the control host 10, and the control host 10 is placed in the tub body (under the water) of the bathing device (not shown), placed on the edge (not shown) of the bathing device (not shown), placed on any side wall of the tub body of the bathing device (not shown) or placed in the living environment through the fixing bracket 18. In addition, it should be noted that the bathing device mentioned in this invention includes but is not limited to bathtubs, bath buckets, bath pools, hand or foot bath buckets and hydrotherapy pools.

Figure 3:
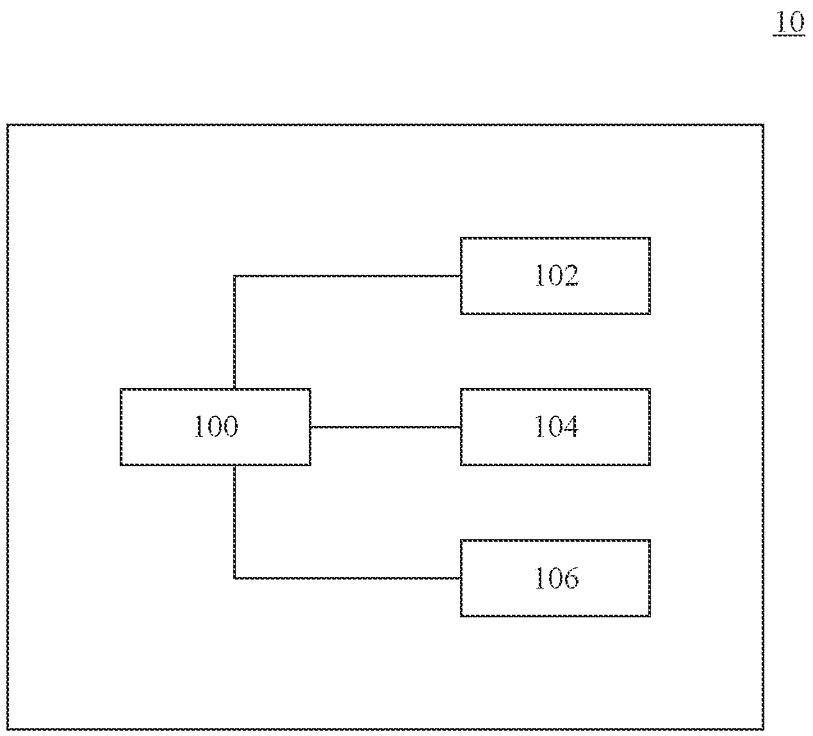
FIG. 3 is a schematic block diagram of a control system of a control host in accordance with the present invention disclosed herein.

Please refer to FIG. 3. FIG. 3 is a schematic block diagram of a control system of a control host in accordance with the present invention disclosed herein. In FIG. 3, the control host 10 includes a process module 10, an IR transmission module 102, a light emitting module 104 and a power supply module 106, in which the process module 100 is electrically connected to the IR transmission module 102, the light emitting module 104 and the power supply module 106 respectively. The process module 100 receives the signal transmitted by the control button set 12 (as shown in FIG. 2), for example, when the user pressed the startup/shutdown button 13 (as shown in FIG. 2) of the control host 10, the process module 100 receives the startup/shutdown signal transmitted by the startup/shutdown button 13 and the process module 100 processes the startup/shutdown signal and transmitted to the power supply module 106 to startup/shutdown the control host 10, and at the same time, the startup/shutdown signal is transmitted to the air provider 20 (as shown in FIG. 1) through the IR transmission module 102 to startup/shutdown the air provider 20 (as shown in FIG. 1). In another embodiment, when the process module 100 receives an intensity signal transmitted by the intensity button 14 (as shown in FIG. 2), the intensity signal is processed by the process module 100 and is transmitted to the air provider 20 (as shown in FIG. 1) through the IR transmission module 102, thereby regulating the air flow supplied by the air provider 20 (as shown in FIG. 1), and the bubble density generated by the bubble bathmat 30 (as shown in FIG. 1) is controlled. In another embodiment, when the process module 100 receives the light control signal from the lighting button 15 (as shown in FIG. 2), the process module 100 processes the lighting signal and sends it to the light emitting module 104, so that the light emitting element 17 (as shown in FIG. 2) is emitted light according to the lighting signal.

It should be noted that the lighting mode of the light emitting element 17 (as shown in FIG. 2) includes a fixed color light source and a cyclic color-change light source, in which the fixed color light source is a single-color light source with a single brightness, and the single light source includes blues light source, light blue light source, blue-green light source, white light source, yellow light source, pink light source, red light source, orange light source, yellow-green light source or green light source. User can choose the color light source according to their personal preferences. The cyclic color-change light source is switched cyclically by multiple color light sources and brightness of the light source according to a program, and the cyclic color-change light source is switched sequentially from the blue light source, light blue light source, blue-green light source, white light source, yellow light source, pink light source, red light source, orange light source, yellow-green light source and green light source. The above embodiments are only provided as examples and not limited to the colors of light sources described above. The control host 10 further includes a power supply module 106, which is used to provide the power required by the control host 10 during operation.

Figure 4:
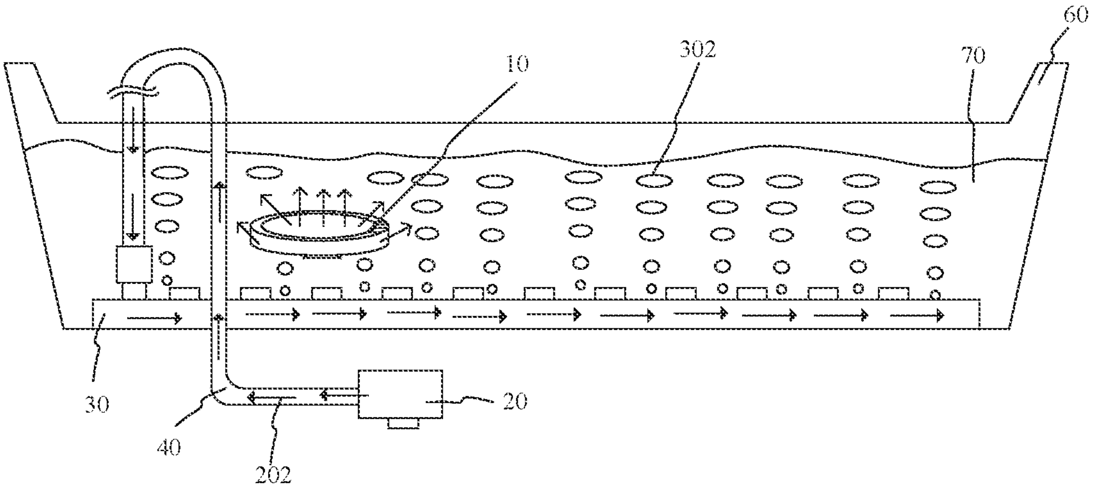
FIG. 4 is a schematic diagram showing the use of the situational air bubble spa machine in accordance with the present invention disclosed herein.

Please refer to FIG. 4. FIG. 4 is a schematic diagram showing the use of the situational air bubble spa machine in accordance with the present invention disclosed herein. In FIG. 4, the bubble bathmat 30 of the situational air bubble spa machine 1 is connected to the air provider 20 through the pipe fittings 40, the bubble bathmat 30 is placed on the bottom of the body of the bathing device 60 filled with the water 70, the user pressed the startup/shutdown button 13 (as shown in FIG. 2) to start the control host 10, the control host 10 is placed in the water to float, or fixed at any position on the bathing device 60. When the user presses the intensity button 14, in addition to starting the air provider 20, the air provider 20 also provides the air 202 into the bubble bathmat 30 through the pipe fittings 40 to generate bubbles 302 from the water 70. User can adjust the level of the intensity button 14 according to the user's preference, thereby adjusting the bubble density generated by the bubble bathmat 30. For example, when the level of the intensity button 14 (as shown in FIG. 2) is adjusted to a weak level, the air provider 20 outputs a smaller air flow, such as 17-20 liters/second (L/s), and the bubbles velocity generated will be slower and the bubble density will be lower. When the level of the intensity button 14 (as shown in FIG. 2) is adjusted to a strong level, the air provider 20 will output a larger air flow, such as 25-29 L/s, at this time, bubble velocity generated by the bubble bathmat 30 (as shown in FIG. 1) will be faster and the bubble density will be higher.

In addition, when the user presses the lighting button (as shown in FIG. 2), the fixed single-color light source with a single brightness or multiple color light sources and the brightness of the light sources is switched according to the program according to the user's preferences. When the user wants a situational environment with a single-color light source with a single brightness, for example, the user wants to enjoy a Greek-style bathing massage situation, the user can choose the blue-green light source. When the control host 10 is placed under the water, due to the blue-green light source is emitted from the top surface 16*t* and the side surface 16*s* of the main body 11 of the control host 10, the blue-green color light source is diffused from the top surface 16*t* and the side surface 16*s* of the main body 11 and is refracted by the water 70, thereby, in addition to the water 70 in the bathing device 60 exhibits blue-green color, the bathing environment such as bathroom has turned into a blue-green environment in Greek style. Because the blue-green water surface fluctuates with the bubbles, the bathing environment achieves the best situational lighting effect.

According to abovementioned, the situational air bubble spa machine of the present invention can provide ordinary office workers, housewives, and/or retired people who do not need to decorate the bathtub at home and can enjoy the same benefits as high-priced massage bathtubs at a relatively small cost. The volume of situational air bubble spa machine of this invention is small and easy to carry, so the business-people can easily store it in their luggage when they are on business trips. After returning to a hotel from a business trip, they can use the situational air bubble spa machine of the present invention in hotel to enjoy the situational bubble massage in the bathtub of hotel to relieve the physical and mental stress of a business trip.

What is claimed is:

1. A situational air bubble spa machine is composed a control host, an air provider, and a bubble bathmat, the control host is communicated with the air provider, the air provider and the bubble bathmat are connected through a pipe fittings, wherein the control host comprising:

a main body;

a light emitting element, the light emitting element is disposed in the main body;

a control button set, the control button set is arranged on a top surface of the main body, the control button set at least includes a startup/shutdown button, an intensity button and a lighting button, wherein the startup/shutdown button is used to control the startup and shutdown of the control host, the intensity button is used to regulate the air flow supplied by the air provider to the bubble bathmat, thereby regulating the bubble density generated by the bubble bathmat, and the lighting button is used to control the startup, shutdown and lighting mode of the light emitting element; and a fixing bracket, the fixing bracket is arranged on a bottom surface of the main body.

2. The situational air bubble spa machine according to claim 1, wherein the control host includes a process module, an IR transmission module, a light emitting module and a power supply module, the process module is electrically connected with the IR process module, the light emitting module and the power supply module respectively, wherein the process module is used to receive and process a startup/shutdown signal transmitted by the startup/shutdown button and to startup/shutdown the air provider with the startup/shutdown signal transmitted by the IR transmission module, receive an intensity signal transmitted by the intensity button to regulate the air flow of the air provider according to the intensity signal transmitted by IR transmission module, and receive and process a lighting signal of the lighting button and transmitted to the light emitting module to regulate the lighting mode of the light emitting element according to the lighting signal; and the power supply module is used to receive the startup/shutdown signal processed by the process module and startup/shutdown the control host according to the startup/shutdown signal.

3. The situational air bubble spa machine according to claim 2, wherein the lighting mode of the light emitting element includes a fixed color light source or a cyclic color-change light source.

4. The situational air bubble spa machine according to claim 3, wherein the fixed color light source is a single-color light source with a single brightness.

5. The situational air bubble spa machine according to claim 4, wherein the single-color light source includes blues light source, light blue light source, blue-green light source, white light source, yellow light source, pink light source, red light source, orange light source, yellow-green light source or green light source.

6. The situational air bubble spa machine according to claim 1, wherein the lighting mode of the light emitting element includes a fixed color light source or a cyclic color-change light source.

7. The situational air bubble spa machine according to claim 6, wherein the fixed color light source is a single-color light source with a single brightness.

8. The situational air bubble spa machine according to claim 7, wherein the single-color light source includes blues light source, light blue light source, blue-green light source, white light source, yellow light source, pink light source, red light source, orange light source, yellow-green light source or green light source.

9. The situational air bubble spa machine according to claim 6, wherein the cyclic color-change light source is switched cyclically by multiple color light sources and brightness of the light source according to a program.

10. The situational air bubble spa machine according to claim 6, wherein the cyclic color-change light source is switched sequentially from the blue light source, light blue light source, blue-green light source, white light source, yellow light source, pink light source, red light source, orange light source, yellow-green light source and green light source.

11. The situational air bubble spa machine according to claim 1, wherein a housing of the main body is a diffusion plate, a light emitted by the light emitting element is diffused outward through the diffusion plate.

12. The situational air bubble spa machine according to claim 1, wherein the startup/shutdown button, the intensity button and the lighting button are independently controlled.

13. The situational air bubble spa machine according to claim 1, wherein the control host in a body of a bathing device, an edge of the bathing device any side wall of the body of the bathing device.

14. The situational air bubble spa machine according to claim 1, wherein the control host further comprising a power supply unit for supplying the power required for operation of the control host.

* * * * *